United States Patent [19]

Ojima et al.

[11] 4,423,535
[45] Jan. 3, 1984

[54] SPRING BALANCER

[75] Inventors: Juji Ojima, Ebina; Yuichi Nagase, Nagano, both of Japan

[73] Assignee: NHK Spring Co., Ltd., Yokohama, Japan

[21] Appl. No.: 249,719

[22] Filed: Mar. 31, 1981

[51] Int. Cl.³ .............................................. E05F 5/08
[52] U.S. Cl. ...................................................... 16/85
[58] Field of Search ............... 16/82, 85, 84, DIG. 10, 16/DIG. 21, 83, 71, 72, 76, DIG. 17, 49, 50, 75, 77, 337; 267/167, 168

[56] References Cited

U.S. PATENT DOCUMENTS

| | | | |
|---|---|---|---|
| 693,021 | 2/1902 | Horsfield | 16/84 |
| 997,432 | 7/1911 | Adam | 16/49 |
| 1,123,226 | 1/1915 | Berry | 16/49 |
| 1,731,561 | 10/1929 | Campbell et al. | 16/50 |
| 3,083,400 | 4/1963 | Anderson | 16/76 X |
| 3,555,591 | 1/1971 | Sogoian | 16/82 X |
| 3,711,892 | 1/1973 | Tabor | 16/85 |
| 4,048,695 | 9/1977 | Juilfs et al. | 16/82 X |

*Primary Examiner*—E. R. Kazenske
*Assistant Examiner*—John S. Brown
*Attorney, Agent, or Firm*—Fleit, Jacobson, Cohn & Price

[57] ABSTRACT

A spring balancer having a compression coil spring and a friction ring. Properties of the spring and a friction force provided by the ring are designed to fit the moment of revolution of a lid that can be opened or closed upward and downward around a revolution or pivot axis. The balancer makes it possible to open or close the lid with a small force and allows stopping of the lid at any position in the whole process of the opening or the closing.

5 Claims, 5 Drawing Figures

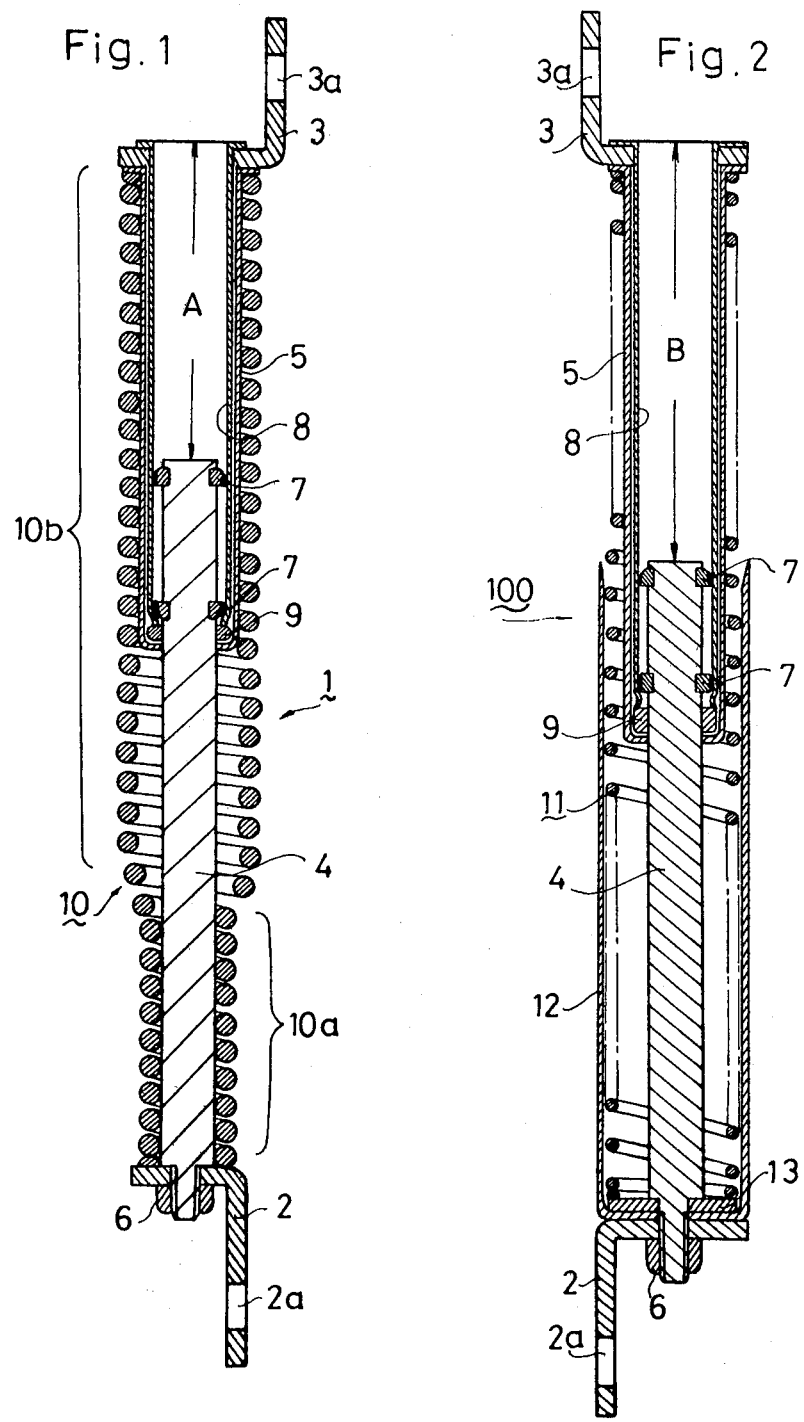

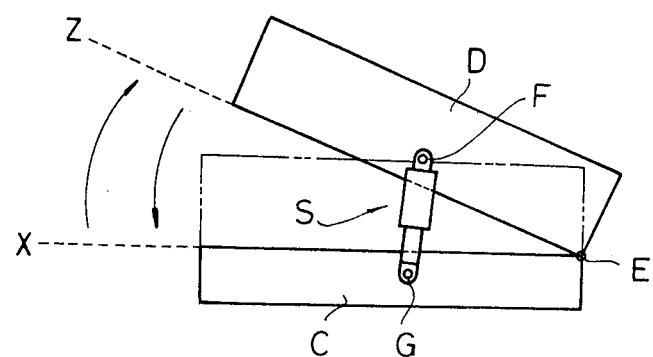
(a)
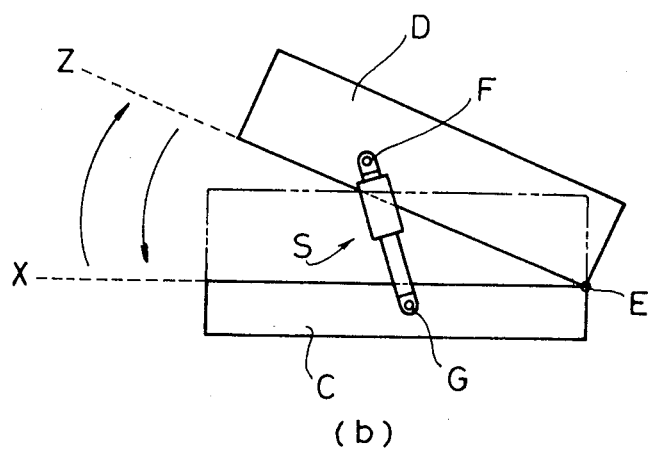
(b)
Fig. 3

SPRING BALANCER

BACKGROUND OF THE INVENTION

This invention relates to a spring balancer used for a lid having a heavy weight which opens or closes upward and downward around a revolution or pivot axis (hereafter merely called "lid").

As an example of such a lid having a heavy body as described above, there exists an office machine, for instance, a copy apparatus having a heavy lid.

Heretofore, the lid which is opened and closed at the time of inspection and maintenance of the copy apparatus is heavy. Accordingly, a hinge is used with a torsion spring or the like employed with the revolution or pivot axis. In this case, however, a wide space is required near the revolution or pivot axis for attaching the spring. Further, it is difficult to design the spring to agree with the moment of revolution of the lid and it is also difficult to stop it at any position through the whole process of opening and closing.

Furthermore, when such hinge as described above is not in use, the hinge is provided with a balancer, such as gas spring, oil spring or the like between the lid and the main body at a position spaced from the revolution axis. Although it is easy to make the properties of these balancers agree with the moment of revolution of the lid, these necessitate sealing techniques for the prevention of the leakage of gas or oil, whereby this causes a high cost, together with being incapable of maintaining a complete sealing for a long period. Accordingly, gas or oil leakage occurs, by all means, and the reliability as a balancer is low.

Furthermore, since the properties of said gas spring, oil spring and the like vary according to the change of the temperature, these have such defect as the difficulty of maintaining the balancer performance always constant, despite change of the environment.

SUMMARY OF THE INVENTION

The object of this invention is to provide a spring balancer wherein the overall properties of the compression spring and the friction of a friction ring used with the compression coil spring are designed to fit the moment of revolution of the lid. As a result, the lid can be operated with a small force and its movement can be stopped at any position through the whole opening or closing process.

Another object of this invention is to provide a spring balancer wherein overall properties of the balancer include spring properties of a compression coil spring and the friction between a friction ring and a rod. These properties are designed to be slightly larger than the moment of revolution of the opening and closing points near the terminal points of the lid movement and to agree with the moment of revolution of the lid at other intermediate opening and closing positions whereby when the locking of the lid at the terminal point of the closing is released, the lid is stopped in a slightly open state, thereby being capable of preventing the impact opening operation to the terminal point.

Further, another object of this invention is to provide a spring balancer in which it is possible to prevent the buckling accompanied by compressive operation of the compression coil spring through the whole opening and closing process of the lid and to use the spring properties of the compression coil spring effectively without intervention or contact with other parts by buckling of the spring and through the whole opening and closing process.

BRIEF DESCRIPTION OF THE DRAWINGS

Referring to the attached drawings, the features and the effects of this invention will be described as follows.

FIG. 1 is a vertical sectional view of a spring balancer which shows the relationship of the components in a free state according to one example of this invention.

FIG. 2 is a vertical sectional view of another example of a spring balancer which shows the relationship of the components.

FIGS. 3(a), (b) are conceptual explanation views of the spring balancer in a state of employment in this invention.

DETAILED DESCRIPTION OF THE INVENTION

Figure 4:
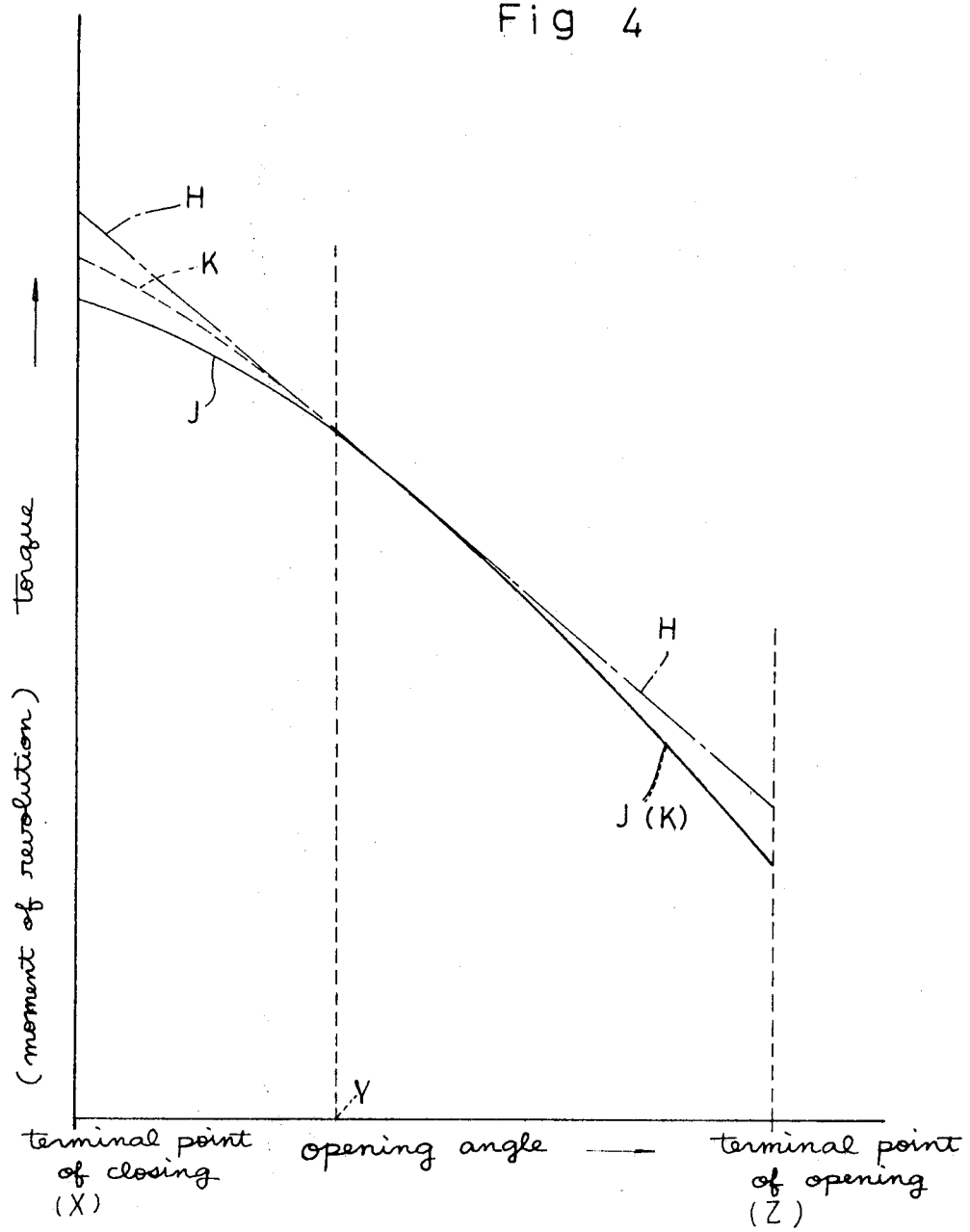
FIG. 4 is a graph which shows the relation between opening angle and torque in each spring balancer, and the lid in accordance with this spring.

In a spring balancer 1 of this invention shown in FIG. 1, there is fixed a bracket 2 pivotably carried on a fixed body side (or a lid side) at one end portion of a rod 4. At one end portion of a cylinder 5, which moves slidably along the rod 4, there is fixed a bracket 3 pivotably carried on the lid side (or fixed body side).

The numerals 2a and 3a are holes whereby the spring balancer is pivotably carried on the fixed body (or the lid) and the numeral 6 is a nut.

The inserting condition of the rod 4 into the cylinder 5 in free state is such that a part of the end portion of the rod 4 is inserted into the cylinder 5, as shown in FIG. 1, said rod 4 and cylinder 5 being adapted to have a relatively adjustable inserting length, within a range of A. The range A is properly determined in accordance with the range of the opening and closing of the opening and closing material.

Inside the cylinder 5, a guide cylinder 8 is fixed to the bracket 3 at one end thereof. The relative elongation or shrinkage between rod 4 and cylinder 5 is opposed by friction between the slider 7 fixed to the inserting portion of the rod 4 and inner wall of the guide cylinder 8.

The slider 7 serves to prevent the drawing out of the rod 4 from the cylinder 5.

At the end portion of the guide cylinder 8 positioned at the inside of the open end of the cylinder 5 which is an opening of the insert, there is fixed a friction ring 9 that closely contacts with the outer circumference of the rod 4, said friction ring 9 providing a given friction when the rod 4 and the cylinder 5 relatively translate in the axial direction.

The compression coil spring 10 is attached to the brackets 2 and 3, with the rod 4 and the cylinder 5 inserted therein. The compression coil spring has a coil portion having a small diameter 10a wherein one end portion of the rod 4 is inserted therethrough, said portion being formed to have an inner diameter equivalent to the outer diameter of the rod 4; and another coil portion having a large diameter 10b which has an inner diameter equivalent to the outer diameter of the cylinder 5. Since the compression coil spring 10 has the small coil portion 10a and the large coil portion 10b, the buckling phenomenon of the coil spring at the time of compression can be effectively prevented.

The spring balancer 100 of this invention, as shown in FIG. 2, is fixed to the end of the rod together with the compression coil spring 11, and is different from said spring balancer 1 in only one point. In the spring balancer 100, there exists a guide cylinder 12 which includes therein a coil portion having the inserted rod 4 of the compression coil spring therethrough and an open end of the cylinder 5 therein.

Therefore, the same elements as those which constitute the spring balancer 1 are shown with the same numerals and the explanation is abridged.

The compression coil spring 11 is one coil spring wherein the whole length of the spring is formed to have an inner diameter corresponding to the outer diameter of the cylinder 5.

The guide cylinder 12 is designed to be approximate to the outer diameter of said coil spring in considering that the compression coil spring 11 enlarges the inner diameter of the guide cylinder slightly at the time of the compression operating. The bottom portion of guide cylinder 12 is fixed to one end of the rod 4 with nut 6 so as to grasp a sheet member 13 and a bracket 2.

Further, the whole length of the guide cylinder 12 is required to be at least a length equivalent to the length of the coil portion inserted therein, said coil portion having the rod 4 inserted therein.

Since the compression coil spring 11 has the cylinder 5 and the guide cylinder 12, the buckling phenomenon at the time of the compressive operation can be prevented effectively.

Thus, since the spring balancer 100 does not have the coil portion having small diameter 10a of the compression coil spring 10, it is possible to enlarge the range B wherein the rod 4 and the cylinder 5 relatively translate in the axial direction more than the range A in the spring balancer 1.

Then, the states of the employment of these spring balancers, 1 and 100, will be conceptually described based upon FIGS. 3(a) and (b).

The symbols C and D in FIGS. 3(a) and (b) are a fixed body and a lid respectively, and lid D is adapted to open or close around the rotational axis E.

Further, X and Z show terminal points of movement of the lid D.

The symbol S is a spring balancer, wherein the spring balancer according to this invention (1 or 100) is used. The spring balancer S is secured to fulcrums F and G rotatively through brackets (brackets 2 and 3 in an apparatus 1 or 100) at a given position spaced from the rotative axis E in fixed body C and lid D. The spring balancer S is secured so as to define the terminal point of the opening movement of the lid D. In this case, when the fulcrums F and G are designed to be positioned approximately on a perpendicular line with respect to a divided line (Y-axis) or line of contact of the fixed body C and the lid D, it is called "vertical type", while when the fulcrum F of the lid D is designed to be slightly shifted in a direction towards or away from the rotative axis E, with respect to the fulcrum G of the fixed body C, it is called "oblique type". There appears the following difference in operation concerning the balancer S according to the relation of the erected positions of the fulcrums, F and G.

In other words, the balancer S of the vertical type is smaller in extension and shortening of the length than that of the oblique type and larger in load difference.

Accordingly, in the compression coil spring 10 or 11 used for the balancer S, it is necessary to design the spring constant larger in the case of the vertical type than in the case of the oblique type. Further, in the case of the oblique type, it is desirable to use the spring balancer 100 wherein the range of the extension and the shortening of the length of the balancer S can be made larger. Furthermore, the features of the spring balancer in this invention are described based upon the graph which shows the relation between the rotation angle and the torque of the lid D represented in FIG. 4. FIG. 4 is a graph which shows the relation between the opening angle of the lid D and the torque. The curve H represents a characteristic curve in a case when there is no use of a friction ring of the type used in the balancer of this invention; in other words a characteristic curve of the compression coil spring; J is a characteristic curve of the properties of the moment of revolution of the lid D; and K is a characteristic curve of the properties of the balancer S of this invention.

As is easily understood from curve H in FIG. 4, it is impossible to make the characteristic curve of the compression ring agree with the moment of revolution J of the lid D by only using the compression coil spring, however the spring constant may be designed.

This invention is made to obtain properties which agree with the moment of revolution J of the lid D by the overall properties of the spring properties and the friction ring.

Further, with the spring balancer S according to this invention, a characteristic curve can be obtained that has properties which agree with the moment of revolution J of the lid D, during a portion of the lid movement, and also slightly exceed the moment of the revolution of the lid D near the terminal point of closing of the lid D, as shown with curve K in FIG. 4.

When the spring balancer S is designed to have a characteristic curve that agrees with the moment of the revolution J of the lid D, said lid D can be operated not only with a small force, but also can be stopped at any position through the whole process of the opening and closing of the lid D.

Further, in case that the spring balancer is designed to provide the properties represented by curve K shown in FIG. 4, when the locking of the lid D at the terminal point of the closing is released, said lid D is slightly opened to stop at point Y in FIG. 4 and an impact operation during movement of the terminal point of closing can be prevented.

Furthermore, in the spring balancer S, since a coil portion having a small diameter is formed as a part of the compression coil spring, or a guide-cylinder is used wherein the coil is inserted for preventing the buckling phenomenon of the compression coil spring, the spring properties of the coil spring can be always maintained at normal state, without contacting other parts due to the coil buckling.

What is claimed is:

1. A spring balancer positionable between a fixed member and a movable member having an end hingedly connected to the fixed member so that the movable member is pivotable about a substantially horizontal axis between open and closed positions, said spring balancer comprising:
   a cylinder;
   a first bracket connected to one end of said cylinder for connecting said balancer to one of the fixed and movable members, the other end of said cylinder being open;
   a rod having one end portion inserted into the open end of the cylinder;

a second bracket connected to the other end portion of said rod for connecting said balancer to the other of the fixed and movable members;

friction means positioned in the cylinder in the vicinity of the open end for engaging the rod and for exerting a friction force on the rod opposing movement thereof during pivoting of the movable member;

a compression coil spring encompassing said cylinder and said rod so that said spring is compressed when said one end portion of said rod moves into said cylinder as said movable member moves between open and closed positions thereof so that the compressed coil spring assists movement of the movable member from its closed to its open position; and means for retaining the one end portion of the rod in said cylinder.

2. The spring balancer according to claim 1, further comprising a guide cylinder inserted into said cylinder for guiding movement of said rod with respect to said cylinder.

3. The spring balancer according to claim 1 or 2, wherein said coil spring has a first portion with an internal diameter corresponding to the external diameter of said rod and a second portion with an internal diameter corresponding to the external diameter of said cylinder so that said spring does not buckle during compression thereof.

4. The spring balancer according to claim 1 or 2, further comprising a second cylinder encompassing said rod and said compression spring, said second cylinder having one end connected to said second bracket and an internal diameter larger than the external diameter of said compression spring so that said second cylinder prevents buckling of said compression spring during compression thereof.

5. A spring balancer positionable on a rotatable member rotatable about a horizontal axis between first and second positions, said spring balancer comprising:

a cylinder;

a rod inserted into said cylinder for relative axial movement with respect to said cylinder, one end of one of said rod and said cylinder being securable to the rotatable member and one end of the other of said rod and said cylinder being securable to a fixed body;

a friction ring secured to an interior portion of the cylinder so as to closely contact the outer circumference of the rod; and a compression coil spring secured to and encompassing the cylinder so as to be compressed when the rod is advanced into the cylinder during movement of the rotatable member from its second towards its first position, so that the compressed coil spring assists movement of the rotatable member from its first towards its second position, the friction ring frictionally engaging the rod to oppose movement thereof during movement of the rotatable member between its first and second positions and during movement of said member between its second and first positions, said compression coil spring having a first portion with an inner diameter equivalent to the outer diameter of the rod and another portion having an inner diameter equivalent to the outer diameter of the cylinder.

* * * * *